United States Patent [19]

Cheney

[11] 4,200,959

[45] May 6, 1980

[54] APPARATUS FOR FORMING BACON PRODUCT ANALOGUES AND THE LIKE

[75] Inventor: Earl J. Cheney, Calgary, Canada

[73] Assignee: Burns Foods Limited of Calgary, Alberta, Canada, Calgary, Canada

[21] Appl. No.: 892,024

[22] Filed: Mar. 31, 1978

[30] Foreign Application Priority Data

Jul. 14, 1976 [CA] Canada .................................. 256928

[51] Int. Cl.² .............................................. A22C 7/00
[52] U.S. Cl. ...................................... 17/32; 425/308;
426/513; 426/104; 426/279
[58] Field of Search .................... 17/32; 426/513, 279,
426/104; 99/450.7, 450.8, 428; 425/308

[56] References Cited

U.S. PATENT DOCUMENTS

| 3,147,717 | 9/1964 | Smith . | |
|---|---|---|---|
| 3,416,931 | 12/1968 | Posegate | 426/249 |
| 3,765,902 | 10/1973 | Charter | 426/249 |
| 3,851,084 | 11/1974 | Rossen et al. | 426/343 |
| 3,930,033 | 12/1975 | Corliss et al. | 426/103 |
| 4,057,650 | 11/1977 | Keszler | 426/513 X |

Primary Examiner—Willie G. Abercrombie
Attorney, Agent, or Firm—Cushman, Darby & Cushman

[57] ABSTRACT

A multi-component composite meat product such as bacon is formed by preparing a comminuted fat and comminuted lean meat component each component containing optional additives and pumping the separate components through separate manifolds to a forming die. The die includes a plurality of partitions or dividers defining the desired lean and fat configuration of the multi-component composite meat product. Bacon slabs simulating naturally occurring slabs are formed in accordance with the invention by pumping a comminuted fat component through the rear of the forming die and extruding a comminuted lean meat component into the fat component as it passes through the die to provide the multi-component meat. Resultant bacon slabs may thereafter be processed and sliced like the naturally occurring bacon product to produce bacon slices with the desired configuration and size of the lean and fat meat components.

19 Claims, 12 Drawing Figures

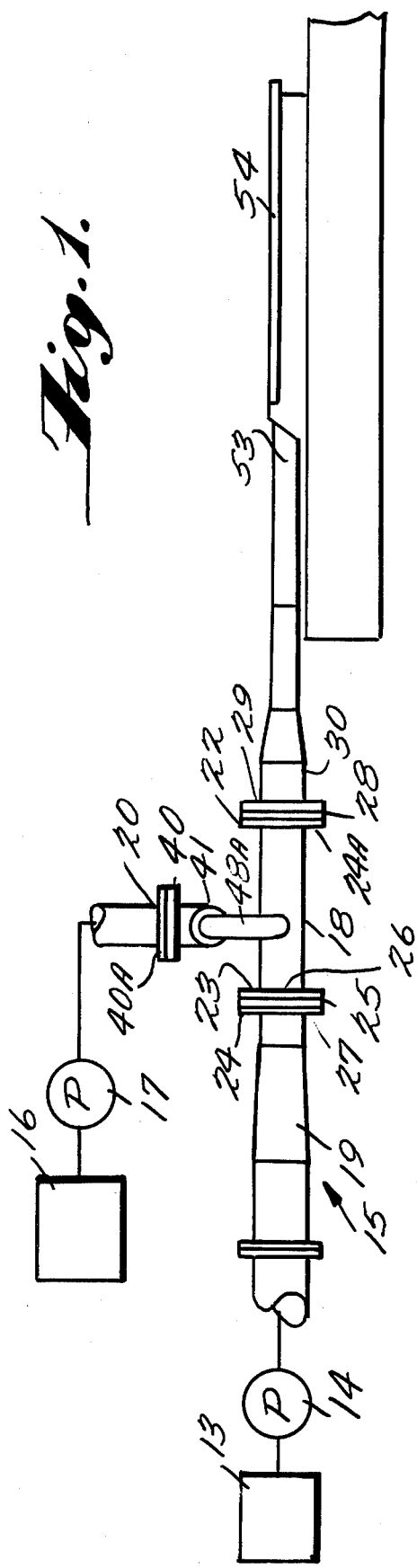
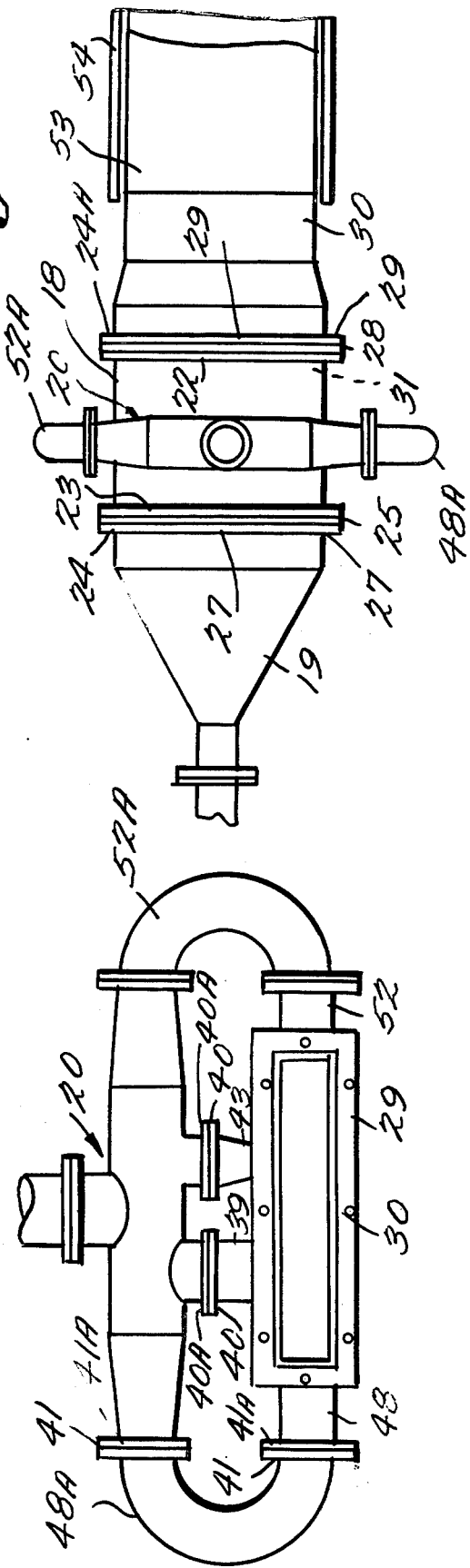

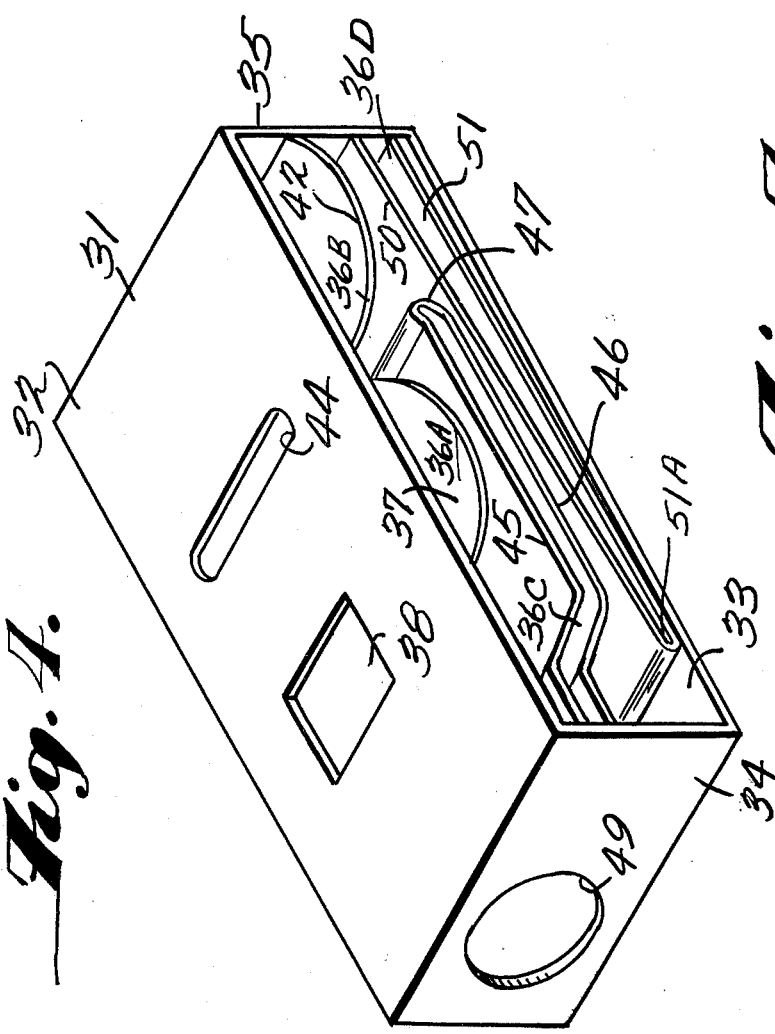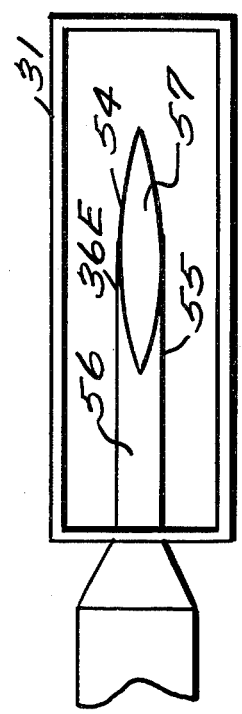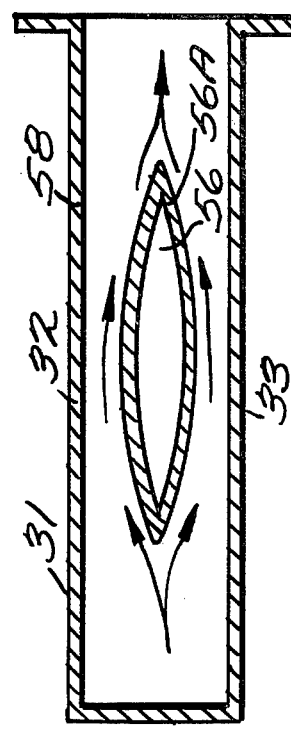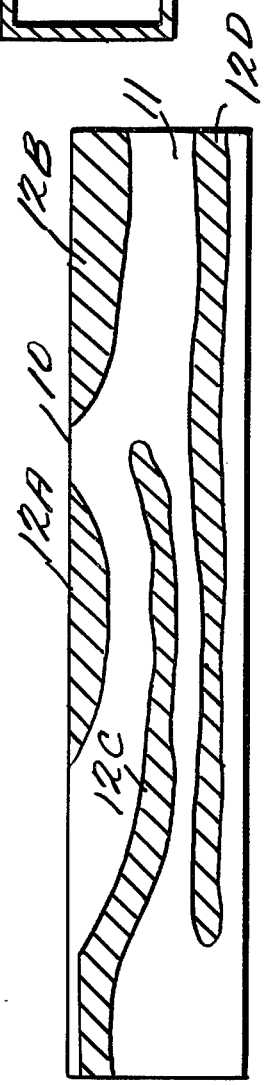

U.S. Patent May 6, 1980 Sheet 3 of 4 4,200,959
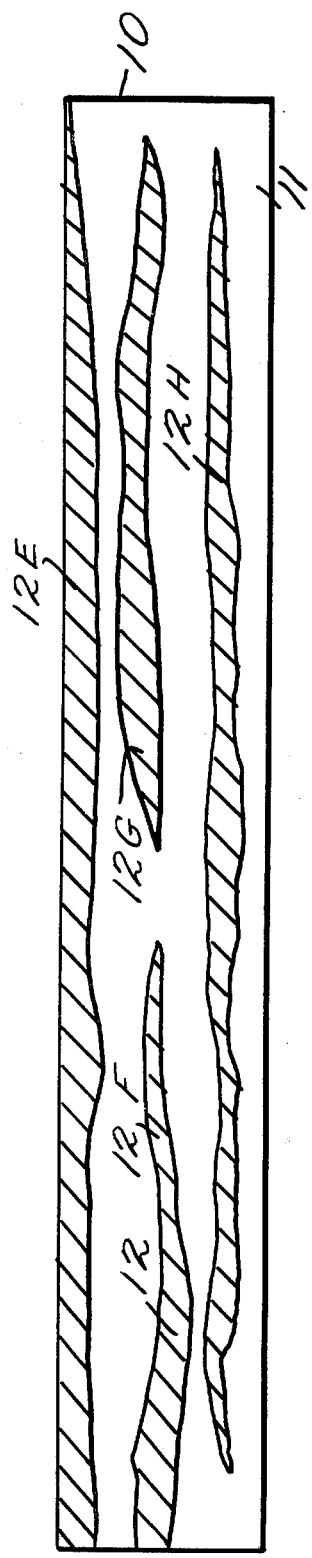
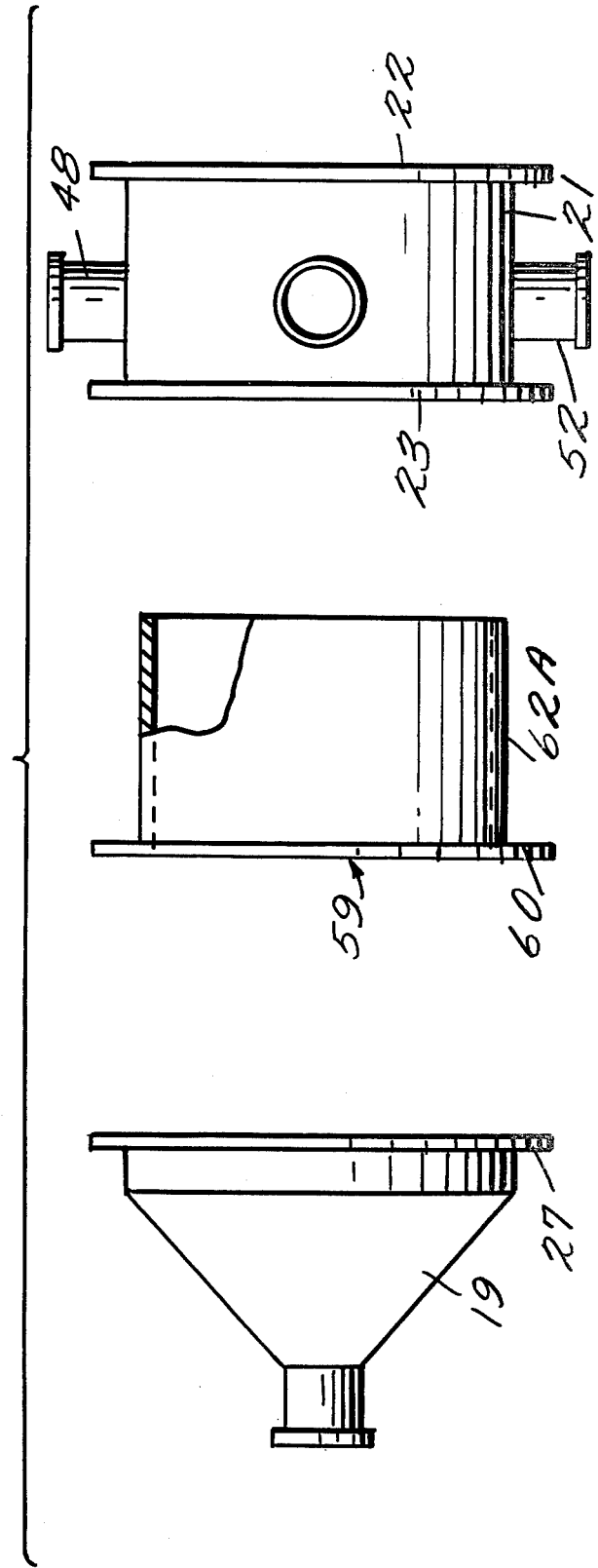

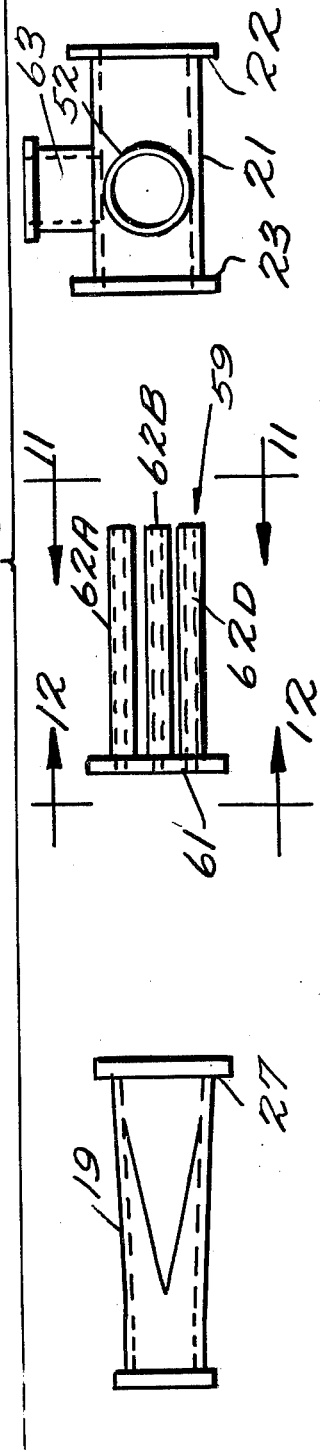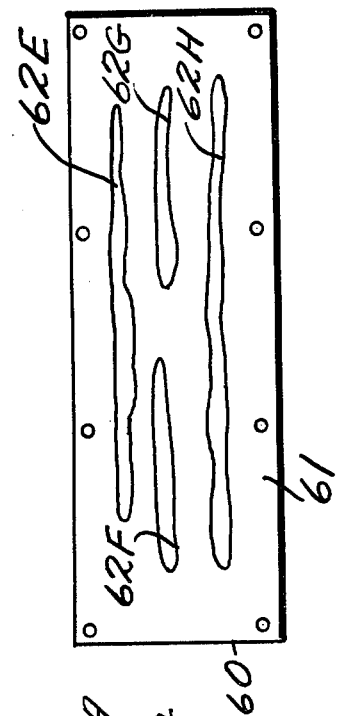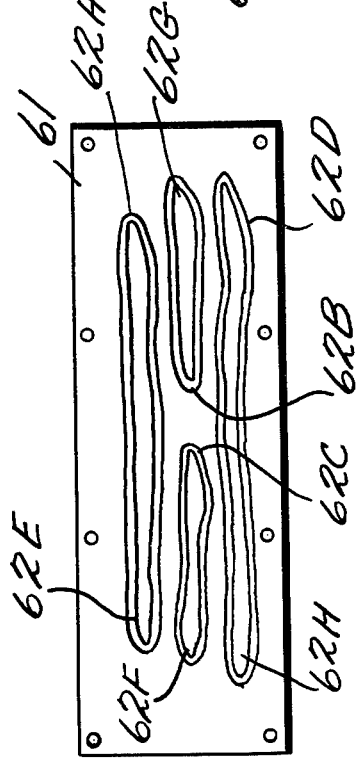

APPARATUS FOR FORMING BACON PRODUCT ANALOGUES AND THE LIKE

BACKGROUND OF THE INVENTION

1. Field of the Invention

This invention relates to new and useful improvements in apparatus to form simulated bacon and other multi-component meat products. More particularly, the invention pertains to apparatus for forming multi-component meat products wherein a first component is pumped through a first manifold to a forming die having one or more partitions therein for extruding a second component into said first component at one or more points in the forming die, the second component being pumped through a second manifold to the forming die.

2. Description of the Prior Art

Simulated bacon products presently available include a sausage-type meat product formed in a slab and sliced in a shape similar to conventional bacon. Apparatus available to provide this form of sausage-type meat includes various grinders and mixing apparatus generally employed in the meat comminuting and grinding procedures. Bacon analogues formed from conventional mixing and comminuting equipment employed for the sausage-type meats suffer the disadvantage of providing bacon analogues that have the visual appearance of sausage rather than bacon no matter how closely the taste or texture of the simulated product approached natural pork bellies. Furthermore, other than bacon products which simulate the size and rectangular shape of a bacon slice, the simulated products of the prior art do not visually approach the texture and configuration of either bacon in the slab form or bacon in the sliced form.

The prior art includes apparatus to provide alternative layers of meat and fat in the form of a slab which then may be sliced such as in U.S. Pat. Nos. 3,911,154 and 4,042,715. These prior art apparatus are useful in simulating layered meats but not such meats as bacon in which the components in the cooked and uncooked state do not have the appearance of layers. Visual appeal of bacon analogues produced by such apparatus is lacking because of the obvious layered appearance of the simulated product both in the slab and sliced form even though the flavor may approach that of bacon.

Apparatus for preparing a multi-component composite as depicted in U.S. Pat. No. 3,558,324 is available for producing various multi-colored meat-like products but has the disadvantage of producing meat products that are difficult to reproduce and has a tendancy to result in a marbelized product.

SUMMARY OF THE INVENTION

The present invention pertains to apparatus designed to overcome the disadvantages and limitations of the prior art by providing a simulated bacon slab which can be processed and handled in much the same manner as naturally occurring slabs and can be handled and thereafter be sliced, packaged and sold in the manner usually employed for natural bacon. The apparatus of the present invention provides a bacon analogue which in both the slab form and thereafter in the sliced form simulates bacon occuring naturally so that it is difficult to distinguish the bacon slab produced by the apparatus of the present invention from bacon produced naturally.

The present invention in addition to producing bacon analogues that are almost indistinguishable from natural bacon slices can be utilized to simulate multi-layered meat products such as pastrami and corned beef and other textured meats having meat, fat and other grain boundaries. To produce these meats and other multi-composite meat products, the apparatus of the present invention may be modified to include such textures and components of natural meat products such as to make meat products formed in accordance with the invention virtually indistinguishable from meat produced and grown naturally.

For the purposes of illustration, the present invention will be discussed with respect to bacon and simulated bacon analogues prepared by utilizing the apparatus of the present invention. In the case of bacon, a two component meat product is formed by first preparing a comminuted fat mixture and a comminuted lean mixture and then employing the apparatus of the present invention to pump one of the components such as the comminuted fat component through one manifold to a die while simultaneously pumping the second comminuted lean mixture through a separate manifold to a separate set of compartments in the forming die wherein the fat comminuted mixture forms a background matrix through which the comminuted lean mixture is injected at pre-selected locations in the die to form the lean meat to fat meat configuration of the desired analogue. It will be recognized by those skilled in the art that the various partitions provided in the die are selected to simulate the lean to fat ratio and configuration of the final bacon product desired to be marketed while maintaining a well defined boundary between the components. In such a manner, the present invention provides a wide range of variability as to the shape and proportions of the lean meat and fat meat to simulate a bacon slab and to thereafter simulate the desired configuration of the sliced bacon for packaging.

The present invention and apparatus not only allows pork to be utilized in the preparation of bacon analogues, but also allows other meats to be formulated in the comminuted fat and lean components. Furthermore, the apparatus of the present invention provides a wide range of variability for the homogeneous addition of seasoning, curing and preserving materials to be employed in the mixture of both the fat and lean portions of the meat to provide superior bacon analogues which possess the same appearance as the natural product and which is difficult to distinguish in either the raw slab or sliced form and which cooks, fries and may otherwise be processed in the same manner as natural bacon. In addition, the relative proportion and configuration of the lean meat component to a fat meat component can be controlled by the size, shape and configuration of the die and also by the number and disposition of meat injectors provided in the die. In the case of bacon, the fat meat component is pumped through the die and the lean meat component injected or extruded into the fat meat matrix at the die. In a like manner, however, the lean meat could be substituted for the fat meat matrix with the fat meat injected into a lean meat matrix at various points in the forming die.

Other features and advantages of the apparatus of the invention will become apparent to those skilled in the art to which this invention relates when the specification is reviewed in conjunction with the appended drawings which illustrate various aspects of the novel apparatus of the invention.

DESCRIPTION OF THE DRAWINGS

FIG. 1 is a side elevational view of the apparatus with parts of the apparatus illustrated in schematic form;

FIG. 2 is a front elevational view of the apparatus of FIG. 1;

FIG. 3 is a top plan view of the apparatus of FIG. 2;

FIG. 4 is an enlarged isometric view of a die constructed in accordance with the invention;

FIG. 5 is a front elevational view of a die illustrating one of the lean meat injectors disposed in the die shell;

FIG. 6 is a side elevational view of FIG. 5;

FIG. 7 is a schematic elevational view of a sliced simulated bacon formed from the die illustrated in FIG. 4;

FIG. 8 is a schematic elevational view of a preferred embodiment of the configuration of a slice of bacon formed by the apparatus of the invention;

FIG. 9 is a top plan exploded view of the component parts of the preferred embodiment of the die assembly of the invention;

FIG. 10 is a side elevational view of the die assembly of FIG. 9;

FIG. 11 is an end elevational view of the die in FIG. 10 viewed along the lines 11—11 in FIG. 10; and FIG. 12 is an end elevational view of the die in FIG. 10 viewed along the lines 12—12 in FIG. 10.

In the drawings, like reference characters are used to denote corresponding parts in the different figures of the drawing.

DETAILED DESCRIPTION OF THE INVENTION

The apparatus of the invention will first be described with reference to FIG. 7 in which character 10 denotes a simulated bacon slice of a substantially lean meat 12, and in particular 12A, 12B, and 12C and 12D disposed therein. The areas of lean meat are similarly formed from a comminuted lean meat mixture which is subjected into the fat component by the apparatus of the invention as will be described herein in greater detail. Bacon slice 10 is a slice from a slab having a corresponding fat to lean configuration produced by the apparatus of the invention. The areas of lean meat 12 and adjoining areas of fat meat 11 may be varied as to size, quantity and shape. In addition, it will be appreciated that the apparatus of the invention is applicable to other forms of layered meat and that the configuration for bacon illustrated in FIG. 7 is for explanatory purposes only, and it is not to be considered as limiting the scope and applicability of the apparatus of the invention.

Multi-component meat products such as bacon slice 10 can be cut from a slab having a corresponding configuration formed by utilizing the apparatus 15 illustrated in FIG. 1. A comminuted fat component of pork fat (and beef fat, if desired) is prepared in a manner to prevent the destruction of the binding characteristics of the fat. The resulting comminuted fat component may be mixed with optional spices, curing agents, preservatives and the like into a coherent mass which is pumped from a source or container 13 by means of a pump 14 to the apparatus of the present invention collectively designated as 15 for preparing meat products having more than one component or phase.

A lean component is similarly prepared by comminuting lean pork (and pieces of beef, if desired) in a similar flaking machine and mixing the lean component with optional spices, curing agents and the like. The comminuted lean mixture is similarly formed into a cohesive mass which is pumped from a container 16 by means of a pump 17 to the apparatus 15.

Referring now to FIGS. 1, 2 and 3, apparatus 15 includes therein a die assembly housing 18, a rear manifold 19 and an upper manifold 20. Die assembly housing 18 is designed to accommodate a die shell 31 therein, the die assembly housing 18 includes a front flange 22 and a rear flange 23. The rear flange 23 is provided with a series of studs 24 disposed around the perimeter of flange 23 and is in confronting engagement with a substantially rectangular retainer plate 25 which is centrally aperatured as at reference character 26. A flange 27 is provided on the front of manifold 19 for mounting on studs 24 whereupon conventional nuts (not shown) may be employed to clamp housing 18 to manifold 19.

Front flange 22 is similarly provided with studs 24A for engagement with a centrally apertured rectangular plate 28 and a substantially rectangular ejector nozzle 30 having a flange 29 for securing nozzle 30 to housing 18 with conventional nuts for engaging studs 24A.

Referring now to FIGS. 2, 3 and 4, a detachable and replaceable die shell 31 is provided for disposition within housing 18 and is secured in place by clamping the assembly together with plates 25 and 28 and holding die shell 31 in the desired position within housing 18. Die shell 31 consists of spaced parallel upper and lower plates defining walls 32 and 33, respectively, together with spaced and parallel vertically situated sidewalls 34 and 35, respectively, thereby defining an open-ended substantially rectangular box-like shell as is illustrated in FIG. 4.

As mentioned previously, the rear manifold 19 is connected to a source of comminuted fat mixture 13 which is pumped by pump 14 through manifold 19 and through die shell 31 to be ejected in the form of a rectangular cross-sectioned slab or block when combined with comminuted lean meat mixture also pumped to die shell 31 and through the ejector nozzle 30 on the front end of the device in a manner as will be hereinafter described in greater detail. Generally the pumping of the comminuted fat mixture or the major portion of the multi-phased meat product is pumped through the rear manifold 19 to be formed by die 31 into the background matrix defined by die shell 31 which forms the meat area 11 of the multi-phased meat as is depicted in FIG. 7. To this background matrix or meat area 11 is injected the second component which in the case of die 31 forms areas 12A, 12B, 12C, and 12D of FIG. 7, which is joined with the first component in ejector nozzle 30.

The upper manifold 20 which is connected to a source of lean meat which is pumped by pump 17 to one or more lean meat mixture injector components in die shell 31 and which in the preferred embodiment are identified by reference characters 36A, 36B, 36C and 36D. It will be appreciated that this configuration is for the purposes of the illustration only, and that other configurations of the injector components can be arranged to suit particular applications and the desired final appearance of the meat product.

Injector component 36A comprises a curved shield 37 extending from the front of the die shell adjacent to the rear thereof and is secured by the edges to the underside of plate 32 of the die shell 31. An elongated slot 38 is formed in the upper plate 32 to communicate with the space defined by curved shield 37 and the portion of the upper plate 32 enclosed thereby. It should also be appreciated that the front end of the injector component 37 is open but that the rear end (not illustrated) is closed.

A conduit 39 (FIG. 2) is provided in the upper surface of housing 18 to communicate via an aperture therein (not illustrated) with the aperture 38 within the upper plate 32. Flange 40 on the top of the conduit 39 and flange 40A extend downwardly from the manifold 20 permitting connection of the conduit to the manifold by means of a conventional clamp (not illustrated) so that a portion of the comminuted mass of lean meat is injected through conduit 39 through opening 38 to injector component 36A to produce a slab and a resulting bacon slice having a lean meat section corresponding to the one identified by reference character 12A in FIG. 7.

Injector component 36B is formed by a curved shield 42 similar to shield 37 utilized to form injector component 36A in die 31. Shield 42 is secured at one end to the underside of upper plate 32 and at the other edge to the side plate 35 and is open at the front end and extends rearwardly and is provided with a closed rear end (not illustrated). A further conduit 43 (FIG. 2) is secured to the upper side of housing 18 and communicates through an aperture therein to an elongated slot 44 formed in the upper plate 32 with housing 18 and communicates through an aperture therein to an elongated slot 44 formed in the upper plate 32 of the die shell 31 in a position to communicate with the area defined by the plate 42 and the upper and side plates 32 and 35 to provide and define the shape of the lean meat component injected by injector component 36B.

Conduit 43 is similarly provided with a flange 40 connectable to flange 40A on the underside of the manifold 20 to provide another portion of the comminuted mass lean meat for injection at this location in die 31 through conduit 43 and opening 44 in die 31 to produce a slab and a resulting bacon slice having a lean meat section corresponding to the one identified by reference character 12B in FIG. 7.

Injector component 36C is formed by an upper curved plate 45 and lower curved plate 46, the edges of which are secured to sidewall 34 of die shell 31 and extend part way across the die shell counter curving at the inner end as indicated by reference character 47. A conduit 48 (FIG. 2) is secured to one side of housing 18 and communicates through an aperture 49 provided in wall 34 of die shell 31 which in turn communicates with the area defined by the curved plates 45 and 46. Conduit 48 in turn is connected to the upper manifold 20 to similarly provide another portion of comminuted lean meat for injection in die 31 to produce a slab and resulting slice of bacon having a lean meat section corresponding to the one defined by reference character 12C in FIG. 7.

Injector component 36D is formed of an upper plate 50 and lower plate 51 joined by a counter-curved inner end 51A. The plates 50 and 51 are secured by the edges thereof to the side wall 35 below plate 42 to extend across the major portion of die shell 31 as shown in FIG. 4.

A conduit 52 (FIG. 2) is secured to the side of housing 18 opposite conduit 48 and communicates via an aperture within housing 18 to an aperture in the side wall 35 (not illustrated) in the area defined by the upper and lower walls 50 and 51 of the injector component 36D to provide another segment for the comminuted portion of lean meat for injection in die 31 to produce a slab and a resulting slice of bacon having a lean meat section corresponding to the one defined by reference character 12D in FIG. 7.

Referring now to FIGS. 2 and 3, the connections are illustrated between conduits 48 and 52 with manifold 20. Curved conditions 48A and 52A extend through approximately 180° and are provided with flanges 41 on each end thereof which connect with flanges 41A on the side ends of the upper manifold 20 and can be secured thereto by means of clamps, bolts or other fastening mechanisms ordinarily employed in the art.

In operation, the comminuted fat and the comminuted lean mixtures are transported via their respective pumps 14 and 17 through manifolds 19 and 20, respectively, and extruded through die shell 31 with the lean meat component being injected into the fat component and being bonded thereto with the assistance of the pressure provided by the die walls. The resulting mass of two component meat exhibiting the boundaries formed by the novel apparatus is extruded from injector nozzle 30 to form a resulting composite slab 53 in FIG. 3 being received by tray 54.

When a sufficient length of meat has been extruded, tray 54 may be enclosed and the product may be smoked and partially cooked in a manner generally employed for bacon obtained for naturally occurring sources and the bacon analogue slab formed may thereafter be sliced into slices similar to those illustrated in FIG. 7.

The strata of lean meat relative to the fat component can be designed to simulate a slice of bacon extremely accurately. Bacon analogues prepared in apparatus in accordance with the invention exhibit the sharp lean to fat boundaries associated with natural bacon. The comminuting and blending of the raw materials, with the resulting protein extraction helps bind together the layers produced by the ejector nozzle with the bonding further being assisted by curing so that when the slices are fried, they remain in a cohesive slice and do not break apart.

The apparatus of the invention may be modified to provide stratum of lean meat within the slice or slab which is not connected to one of the edges of the forming die and in this connection reference should be made to FIGS. 5 and 6. In this embodiment, an injector component is identified by reference character 36E and consists of an upper and lower shield or plate 54 and 55, respectively, which may be inserted through an opening in sidewall 34 of a die shell 31. Injector component 36E may be divided into an elliptical shaped closed portion 56 and an open portion 57, it being understood that the open portion 57 is outboard of the closed portion 56 and of course the entire component is enclosed at the rear thereof. This means that lean meat injected into the fat mixture through the portion 57 will produce a stratum or component which is remote from any of the sides of the slab and the shape of the stratum is defined by the configuration of the open portion 54.

It will be recognized that in utilizing the present invention, it is desirable that the closed portion 56 as shown in side elevation in FIG. 6 be shaped to provide a venturi effect at areas 58 so that the fat mixture being extruded through the die shell 31 is parted by the closed portion 56 and due to the venturi effect results in the formation and filling of the parted portion in which meat injected at the open portion forcing the two components together at the front end 56A, thus recombining and prevent separation of the phases at that point.

Referring now to FIG. 8 there is illustrated a slice of bacon 10 formed utilizing the preferred embodiment of the apparatus of the present invention. Bacon slice 10 of FIG. 8 includes a fat component portion 11 and a lean component portion 12 which is more particularly divided into lean meat sections and islands 12E, 12F, 12G and 12H.

Referring now to FIGS. 9 through 12, the preferred embodiment of the apparatus for forming bacon slice 10 of FIG. 8 is illustrated wherein similar reference characters for similar parts have been employed. The preferred embodiment in contrast to the previous embodiment utilizes container 13 (FIG. 1) as a source for the comminuted lean meat component which is pumped via pump 14 through rear manifold 19 (FIG. 9). Rear manifold 19 is attached by flange 27 to flange 60 of a modified forming die 59 which is attached to a rear flange 23 provided in modified housing 21. As with the previous embodiment, an ejector nozzle 30 (not shown) is attached to the front of a modified housing 21 by employing flanges 22 and studs 24A.

In the preferred embodiment, die shell 59 employs rear flange 60 which not only facilitates the attaching and securing of die shell 59 to housing 21 but also can form a part of a die plate 61 defining the configuration of the lean meat injectors 62A, 62B, 62C and 62D. In die shell 59 the flat rear side of die plate 61 is attached in confronting relationship with rear manifold 19 while the forward end of plate 61 terminates in a plurality of forwardly facing lean meat injectors 62A, 62B, 62C and 62D which define the openings 62E, 62F, 62G and 62H of the modified forming die. Meat injectors 62A, 62B, 62C and 62D may be in the form of general eliplical shaped nozzles on the outside with the inside surface having a configuration matching the desired portion of lean meat in the meat product, these injectors may be attached to die plate 61 by welding or other known methods of attachment. The resulting openings 62E, 62F, 62G and 62H form the lean areas 12E, 12F, 12G and 12H, respectively, of the bacon slice 10 of FIG. 8.

The fat meat area 11 of bacon slide 10 of FIG. 8 is formed from a fat meat component placed in container 16 and pumped to upper manifold 20 (FIG. 1) which communicates with conduits 48, 52 and 63 of housing 21 via curved conduits 48A and 52A, respectively. It will be recognized that housing 21 and manifold 20 have been modified to accommodate a single conduit 63 in the top of housing 21 to accommodate the introduction of a fat meat component into the top of housing 21. The single conduit 63 in the top of housing 21 substitutes for two conduits 39 and 43 in housing 18 of the previous embodiment.

In operation, the modified apparatus illustrated in FIGS. 9–12 utilizes a fat meat component pumped into housing 21 via conduits 48, 52 and 63 thus surrounding the injector nozzles 62A, 62B, 62C and 62D to provide the injection of the lean meat component at the end of the injector nozzles with the composite lean and fat meat mass being ejected through ejector nozzle 10. The extrusion of the lean meat through nozzles 62A, 62B, 62C and 62D into the fat component by the predetermined configuration and disposition of the nozzles in the die of FIGS. 11 and 12 provides a bacon slab and a resulting slice of bacon resembling the bacon slice 10 in FIG. 8.

Modified apparatus of FIGS. 9–12 provides an efficient utilization of die and injector nozzles to produce a bacon slab and slice having a lean meat component 12 divided into lean meat sections such as 12E and lean meat islands 12G and 12H to accurately simulate the fat and lean components of bacon.

It will be further appreciated that other die shells and die formations can readily be accommodated and provided for in the novel apparatus to give different relationships of fat and lean and different shapes to the lean strata depending upon the desired configuration of the multi-component meat product and the desires of the purchasing public.

These and other modifications can be made to the apparatus of the present invention and the invention is amenable to a wide variety of embodiments which can be made by those skilled in the art without departing from the spirit or scope of the invention. It is therefore intended that all such modifications and applications of the invention are within the scope of the invention and that all matter pertaining to specific detail of the apparatus contained in the accompanying specification is to be interpreted as illustrative and not in the limiting sense.

What is claimed is:

1. Apparatus for forming a multi-component product from combining a first viscous component with a second viscous component comprising:
   (a) a housing;
   (b) a die means, said die means including a matrix compartment and an injector compartment;
   (c) a first manifold for receiving a first viscous component, said first manifold communicating with said housing and said matrix compartment of said die;
   (d) a second manifold for receiving a second viscous component, said second manifold communicating with said housing and said injector compartment of said die; and
   (e) means for moving said first and said second visous components to said die means for joining said components in said die means in a configuration determined substantially by the configuration of said matrix compartment and said injector compartment of said die means.

2. The apparatus of claim 1 additionally comprising a plurality of injector compartments in said die means communicating with said housing and said second manifold.

3. The apparatus of claim 1 wherein said die means includes a plurality of partitions forming a plurality of compartments, said compartments communicating with at least one of said manifolds.

4. The apparatus of claim 3 wherein a first compartment of said plurality of compartments in said die means communicates with said first manifold and at least one other of said plurality of compartments in said die means communicates with said second manifold.

5. The apparatus of claim 4 wherein said first compartment in said die means forms a matrix wherein said plurality of second compartments forms a tapered obstruction in said matrix to provide a venturi effect for viscous components flowing from said first compartment.

6. The apparatus of claim 1 wherein said die means consists of spaced parallel upper and lower plates defining a rectangular shaped die having disposed therein a plurality of partitions forming a plurality of meat injector compartments and means for communicating said meat injector compartments with said second manifold.

7. The apparatus of claim 6 wherein said die includes a plurality of matrix compartments surrounding said meat injector compartments, said matrix compartments communicating with said first manifold.

8. The apparatus of claim 7 wherein said die is constructed for detachable mounting within said housing and said die includes a first aperture communicating with said meat injector and disposed in confronting relationship to said second manifold and a second aperture communicating with said first manifold.

9. The apparatus of claim 7 wherein separate pumps are provided for moving each of said viscous components to said manifolds, housing and to said injector and matrix compartments in said die.

10. The apparatus of claim 7 wherein said plurality of meat injector compartments in said die shell includes an open forward end and the rear part of said plurality of meat injector compartments is closed providing a restriction to the flow of a first viscous component in said compartment wherein said injector compartments inject a second viscous component in the parted flow of said first viscous component.

11. Apparatus for forming a simulated bacon slab that simulates the appearance and may be processed in the same manner as bacon from a natural source including obtaining bacon slices therefrom comprising:
 (a) a housing;
 (b) a first manifold said first manifold communicating with said housing for receiving a comminuted fat meat component;
 (c) a second manifold for receiving a comminuted lean meat component, said second manifold communicating with said housing;
 (d) a die shell, said die shell constructed for detachable mounting with respect to said housing, said die shell including at least one partition therein forming a first and second compartment, said first compartment forming a matrix and communicating with said first manifold, and said second compartment forming a meat injector compartment and communicating with said second manifold; and
 (e) means for separately moving said comminuted fat meat component to said first compartment and said lean meat component to said second compartment in said die.

12. The apparatus according to claim 11 wherein said die assembly includes a plurality of second compartments, said second compartments formed in the shape of elliptical nozzles for injecting lean meat in said die shell.

13. The apparatus according to claim 12 wherein said plurality of elliptical nozzles terminate in a configuration of the desired contour of the lean meat portion of a bacon analogue.

14. The apparatus according to claim 11 wherein said means for moving said separate comminuted fat and lean meat components comprises two separate pumps.

15. The apparatus of claim 11 further comprising a nozzle disposed downstream from said die component for compacting the components of the resulting slab.

16. The apparatus according to claim 15 wherein said nozzle includes tapered walls for compacting said fat and lean components in a compacted relationship to one another.

17. The apparatus according to claim 11 wherein said first manifold is disposed substantially adjacent to said die assembly.

18. The apparatus of claim 11 wherein said second manifold includes conduits disposed at an angle substantially transverse to said housing.

19. The apparatus of claim 18 wherein said second manifold includes a plurality of conduits disposed at angles substantially transverse to said housing.

* * * * *